United States Patent [19]

Odobasic

[11] Patent Number: 4,659,069

[45] Date of Patent: Apr. 21, 1987

[54] LAMINATED MECHANICAL ELEMENTS

[76] Inventor: Steven L. Odobasic, 2885 Aurora Ave., #16, Boulder, Colo. 80303

[21] Appl. No.: 714,188

[22] Filed: Mar. 20, 1985

Related U.S. Application Data

[63] Continuation-in-part of Ser. No. 511,955, Jul. 8, 1983, Pat. No. 4,593,889, which is a continuation-in-part of Ser. No. 412,095, Aug. 27, 1982, Pat. No. 4,521,003.

[30] Foreign Application Priority Data

Sep. 26, 1984 [GB] United Kingdom ............... 8424246

[51] Int. Cl.⁴ ................... B60G 11/18; B64C 25/64; F16F 1/16
[52] U.S. Cl. ................. 267/57.1 A; 244/104 R; 267/63 A; 267/141.1; 267/153; 267/154; 280/700; 280/723; 403/228; 464/97
[58] Field of Search ............ 267/57.1 R, 57.1 A, 267/63 A, 141.1, 141.2, 152, 153, 154; 403/220, 222, 224, 225, 228, 291; 416/134 A, 141; 464/94, 96, 97; 280/700, 717, 721, 723; 244/104 R

[56] References Cited

U.S. PATENT DOCUMENTS

| | | |
|---|---|---|
| 1,664,713 | 4/1928 | Strickland . |
| 1,784,436 | 12/1930 | Hadley . |
| 2,144,428 | 1/1939 | Martin . |
| 2,170,627 | 8/1939 | Berryman . |
| 2,608,840 | 9/1952 | Lahaie . |
| 2,942,871 | 6/1960 | Kraus ................ 280/721 X |
| 3,071,851 | 1/1963 | Haushalter ............ 29/453 |
| 3,077,090 | 2/1963 | Haushalter . |
| 3,137,148 | 6/1964 | Kayser . |
| 3,370,483 | 2/1968 | Ditlinger . |
| 3,521,464 | 7/1970 | Kidby . |
| 3,553,978 | 1/1971 | Williams . |
| 3,603,173 | 9/1971 | Brooks ................ 74/581 |
| 3,628,352 | 12/1971 | Stuemky . |
| 3,669,566 | 6/1972 | Bourquardez et al. ...... 416/134 R |
| 3,673,813 | 7/1972 | Wright . |
| 3,769,813 | 11/1973 | Okada . |
| 3,905,208 | 9/1975 | Oyama et al. . |
| 3,967,918 | 7/1976 | Mouille et al. ........ 416/141 |
| 4,014,184 | 3/1977 | Stark . |
| 4,089,190 | 5/1978 | Worgan et al. . |
| 4,129,403 | 12/1978 | Watson ............... 416/134 A |
| 4,173,128 | 11/1979 | Corvelli . |
| 4,222,709 | 9/1980 | Mouille .............. 416/134 A |
| 4,272,971 | 6/1981 | Loyd et al. . |
| 4,279,275 | 7/1981 | Stanwood et al. ........ 138/109 |
| 4,280,339 | 7/1981 | Stuemky . |
| 4,345,876 | 8/1982 | Schwarz et al. ......... 416/134 A |
| 4,358,284 | 11/1982 | Federmann et al. ....... 464/181 |
| 4,362,521 | 12/1982 | Puck et al. ............ 464/181 |
| 4,380,443 | 4/1983 | Federmann et al. ....... 464/181 |
| 4,521,003 | 6/1985 | Odobasic ............. 267/57.1 A |
| 4,593,889 | 6/1986 | Odobasic ............. 267/57.1 A |

FOREIGN PATENT DOCUMENTS

| | | | |
|---|---|---|---|
| 2804256 | 8/1979 | Fed. Rep. of Germany ...... 280/723 |
| 1250215 | 11/1960 | France ............... 280/700 |
| 2395162 | 1/1979 | France ............... 280/700 |

*Primary Examiner*—Douglas C. Butler
*Assistant Examiner*—Richard R. Diefendorf
*Attorney, Agent, or Firm*—Howson and Howson

[57] ABSTRACT

Flexurally stiff members having low torsional stiffness, high transverse shear resistance and high stability are disclosed. In several embodiments, each member includes a flexurally and torsionally stiff tapered elongate beam surrounded by an outer tube-like component of lower torsional stiffness and interconnected by an elastomeric medium which enables the tube-like component to twist relative to the beam while permitting some of the flexural and transverse loads applied to the tube-like component to be transferred to the beam. In several embodiments, the tube-like component includes a pair of interarranged corrugated open section members engaged by one or more stabilizers, including a shrunk fit tube of elastomeric material extending lengthwise between attachment fittings at opposite ends. End fittings for applying various loads to the members are also disclosed.

21 Claims, 19 Drawing Figures

LAMINATED MECHANICAL ELEMENTS

CROSS-REFERENCE TO RELATED APPLICATIONS

The present application is a continuation-in-part of copending application Ser. No. 511,955, now U.S. Pat. No. 4,593,889, filed by Steven L. Odobasic on July 8, 1983 entitled LAMINATED TUBULAR LINK, which is a continuation-in-part of copending application Ser. No. 412,095, now U.S. Pat. No. 4,521,003, entitled TORSION LINK, filed on Aug. 27, 1982 based on a corresponding U.K. application Ser. No. 8127551, filed on Sept. 15, 1981.

The present application discloses subject matter related in part to another application filed concurrently herewith by Jose A. Avila and Steven L. Odobasic and entitled COMPOSITE TORSION LINK, Ser. No. 714,187.

FIELD OF THE INVENTION

The present invention relates to structural element of low torsional stiffness, high flexural stiffness, and high transverse shear resistance.

BACKGROUND OF THE INVENTION

The above referenced applications disclose structural elements of low torsional stiffness, and high transverse shear, flexural and axial strength capable of being used in a variety of mechanical applications where such characteristics are required, such as in connecting rotors to drive hubs in helicopter rotor systems. There are, however, other mechanical applications where substantial transverse shear resistance and flexural stiffness is desired. One such application is in providing landing gear for aircraft. Another application where high flexural stiffness is desirable is in providing rotating drive shafting having high natural frequencies. The present invention provides structural elements suitable for use in a variety of such applications.

BRIEF DESCRIPTION OF THE PRIOR ART

U.S. Pat. No. 2,144,428 discloses an aircraft propeller blade assembly comprising an elongated tapered beam extending radially inside a hollow blade with the outer end of the beam being connected to the blade by a metallic bearing.

U.S. Pat. Nos. 3,370,483; 3,603,173; 3,669,566; 3,967,918; 4,129,403; 4,222,709; and 4,345,876 disclose links of various construction for use in connecting a rotor to a drive hub in helicopter rotor system.

U.S. Pat. Nos. 1,784,436; 1,664,713; 3,077,090; 3,071,851; 3,521,464; 3,553,978; 3,769,813; 4,014,184; 4,089,190; 4,173,128; 4,272,971; 4,279,275; 4,358,284; 4,362,521 and 4,380,443 disclose drive shafts of various construction, including shafts fabricated of composite materials.

U.S. Pat. Nos. 2,170,627; 2,608,840; 3,137,148; 3,628,352; 3,673,813; 3,905,208; and 4,280,339 disclose flexible shaft couplings.

OBJECTS OF THE INVENTION

With the foregoing in mind, an object of the present invention is to provide a novel structural element of low torsional stiffness, high flexural stiffness, and transverse shear resistance capable of being used in a variety of mechanical applications.

Another object of the present invention is to provide a relatively lightweight and strong structural element capable of sustaining substantial flexural and transverse loads and of resiliently accepting torsional loads.

A further object of the present invention is to provide improved fittings for applying various loads, including torque, to a structural element of low torsional stiffness.

A still further object of the present invention is to provide a tube-like member of low torsional stiffness which can be manufactured readily.

Yet another object of the present invention is to provide a novel means for mounting structural elements of low torsional stiffness to provide control of angular deflection.

SUMMARY OF THE INVENTION

More specifically, the present invention provides a structural element of low torsional stiffness, high flexural strength, and high transverse shear resistance. The structural element comprises a flexurally stiff elongate beam surrounded by a tube-like component of lower torsional stiffness and interconnected by a body of elastomeric material engaged between at least an end portion of the beam and the tube-like component for permitting it to twist relative to the beam. The beam and tube-like component are connected at one end to a structure, and the tube-like component is connected at its other end to another structure which applies torque to the tube-like component and applies transverse shear and flexural loads to the beam via the elastomeric connection therebetween. Preferably, the tube-like component includes a pair of arcuate open section members interdigitated with one another and separated by a layer of elastomeric material. The open section members have longitudinal edges movable relative to one another during torque application. The open section members are supported externally by one or more stabilizer rings spaced apart axially thereon. The open section members may also be supported internally by a body of elastomeric material interposed between the beam and the inner periphery of the tube-like component which they form.

In one embodiment, both of the open section members have corrugated arcuate transverse cross-sections; in another embodiment, both open section members are composed of arcuate thin wall members laminated and welded together. In yet another embodiment, a pair of corrugated open section members are interdigitated and stabilized by a layer of elastomeric material molded around their peripheries and extending lengthwise thereof.

End fittings specially designed to transfer torsional loads to the structural element incorporate elastomeric members which are stressed in compression and shear during application of torque and which accommodate lengthwise movement of the open section member edges.

Mounting arrangements for various purposes are also provided.

BRIEF DESCRIPTION OF THE DRAWINGS

The foregoing and other objects, features and advantages of the present invention should become apparent from the following description when taken in conjunction with the accompanying drawings, in which.

DESCRIPTION OF THE PREFERRED EMBODIMENTS

Figure 1:
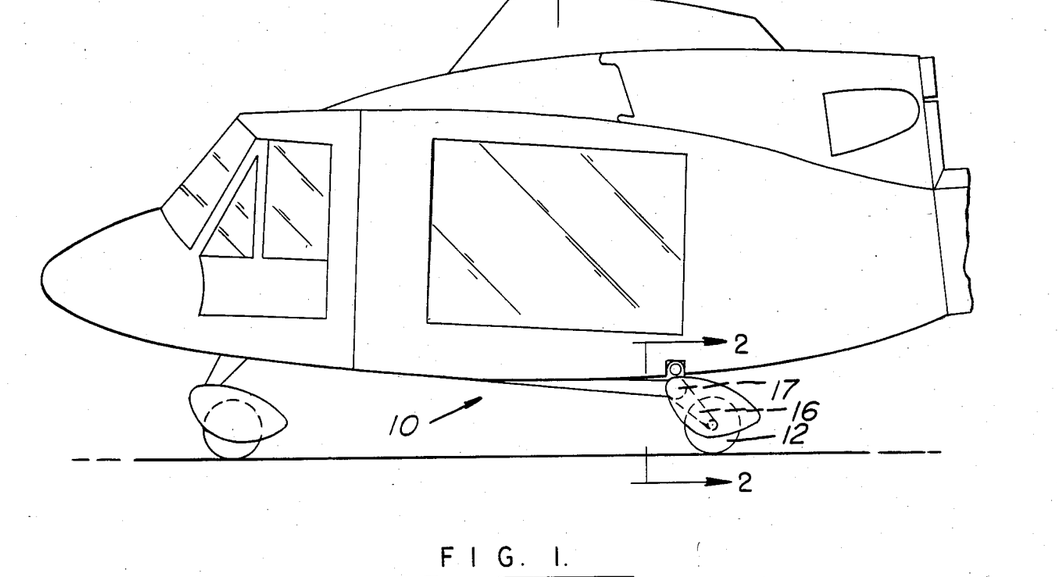
FIG. 1 is a fragmentary elevational view of a helicopter having a landing gear system incorporating a structural element embodying the present invention.
Figure 2:
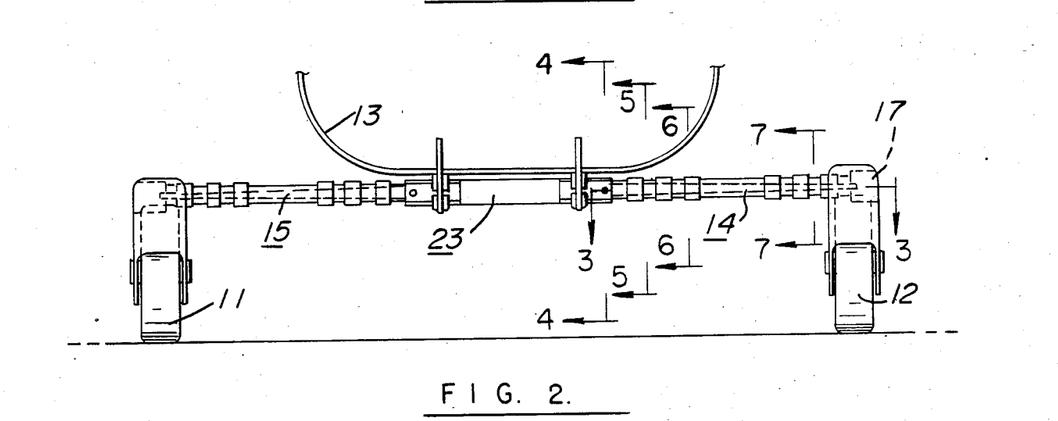
FIG. 2 is an enlarged fragmentary sectional view taken on line 2—2 of FIG. 1.

Referring now to the drawings, FIG. 1 illustrates an aircraft landing gear system 10 in which a structural element embodying the present invention can be utilized beneficially. As best seen in FIG. 2, the landing gear system 10 includes a pair of main wheels 11 and 12 connected to an aircraft fuselage 13 by laterally extending structural members 14 and 15. Each structural element, such as the portside element 14, mounts on its outboard end a coupling 17 which is connected to the wheel 12 by a trailing arm 16.

Figure 3:
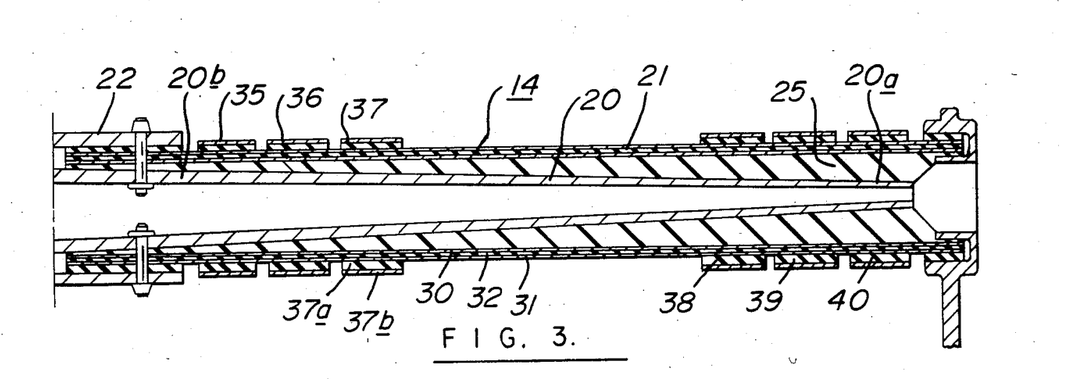
FIG. 3 is an enlarged longitudinal sectional view taken on line 3—3 of FIG. 2.

The structural elements 14 and 15 are capable of sustaining substantial transverse, flexural and torsional loads applied thereto by the wheel arms as they pivot upwardly toward the fuselage 13 to support the weight of the aircraft. To this end, as best seen in FIG. 3, the portside structural element 14 comprises a flexurally stiff elongate beam 20 surrounded along its length by a tube-like component 21 which extends longitudinally in spaced relation therewith. A first means 22 fixedly connects the beam 20 and tube-like component 21 adjacent to their inboard ends to a structure, such as a mounting bracket assembly 23 carried underneath the helicopter fuselage 13. A second means, such as the coupling 17, connects the outboard end of the structural element 14 to another structure, such as the wheel arm 16. A body of elastomeric material 25 is engaged between at least the relatively small outboard end 20a of the beam 20 and the inside of the tube-like component 21. The elastomeric body 25 provides an elastomeric bearing connection which permits the coupling 17 and the tube-like component 21 connected thereto to twist relative to the beam 20 in response to torsional loads while permitting transverse shear and flexural loads to be carried by the beam 20.

The beam 20 is stiff in flexure and torsion and has transverse shear resistance. To this end, the beam 20 has a closed annular cross-section which tapers from a maximum dimension adjacent to its inboard end 20b to a minimum dimension adjacent to its outboard end 20a. In the illustrated embodiment, the beam 20 is of hollow frusto-conical shape and tapers at a constant rate between its inboard and outboard ends. The beam 20 is preferably fabricated of lightweight, high strength aircraft alloy metals, such as aluminum, titanium, and the like; however, it may also be fabricated or composite materials comprising high strength filaments bonded together in a rigid matrix.

Figures 10, 19:
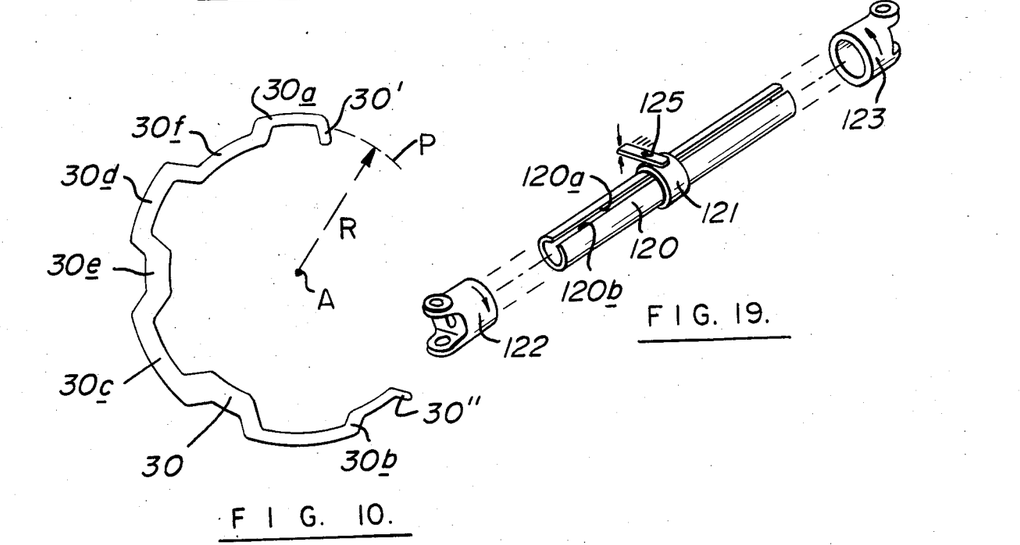
FIG. 10 is a transverse sectional view of one of the corrugated arcuate open section members utilized in the embodiment of the structural element illustrated in FIGS. 1-9.
FIG. 19 (Sheet 3) is a somewhat schematic exploded perspective view of an angular motion inverting mechanism constructed according to the present invention.

The tube-like component 21 surrounding the beam 20 is of lower torsional stiffness than the beam 20, having a torsional stiffness in a range of 1/200 to 1/600 of the torsional stiffness of the beam 20. In the illustrated embodiment, the tube-like component 21 is composed of a pair of longitudinally corrugated arcuate open section members 30 and 31 (FIG. 5) separated from one another along their lengths by layers of elastomeric material $32a$ and $32b$ engaged therebetween and preferably bonded thereto. Preferably each open section member is extruded of metal, such as aluminum, or of plastic, such as graphite-reinforced thermoplastic material, including Torlon. As best seen in FIG. 10 (Sheet 3) each open section member, such as the member 30, has a web with a transverse cross-section which extends around a central axis A through an arcuate extent of at least 180°, and preferably 240°. The open section member 30 terminates in a pair of flanges $30a$ and $30b$ having substantially radially turned lips $30'$ and $30''$, respectively which extend in spaced parallel relation with respect to one another along the axis A between opposite ends of the member 30. The corrugated transverse cross-section of the open section member 30 has raised portions, such as $30c$ and $30d$, projecting outwardly with respect to a medial plane P located a spaced radial distance R from the central axis A. It also has a series of the depressed sections, such as the sections $30e$ and $30f$ extending intermediate the raised sections $30c$ and $30d$. Preferably, the thickness of the web and edge flanges of the open section member 30 varies in the manner illustrated in FIG. 10, from a maximum intermediate the edges $30'$, $30''$ to a minimum adjacent thereto. This assists in uniformly distributing shear stresses in the member 30 and in thereby reducing torsional stiffness. The marginal lips $30'$ and $30''$ enhance the flexural stiffness of the member 30 and terminate in longitudinally extending spaced edges which move lengthwise in opposite directions relative to one another when torque is applied at opposite ends of the member 30.

Figure 5:
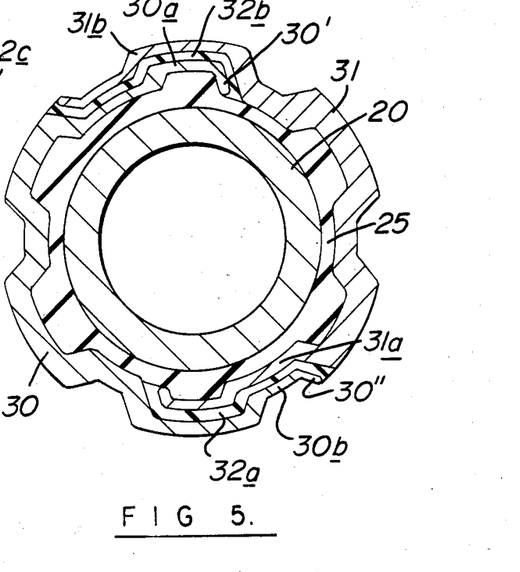
FIG. 5 is a view similar to FIG. 4 but taken on line 5—5 of FIG. 2.
Figure 6:
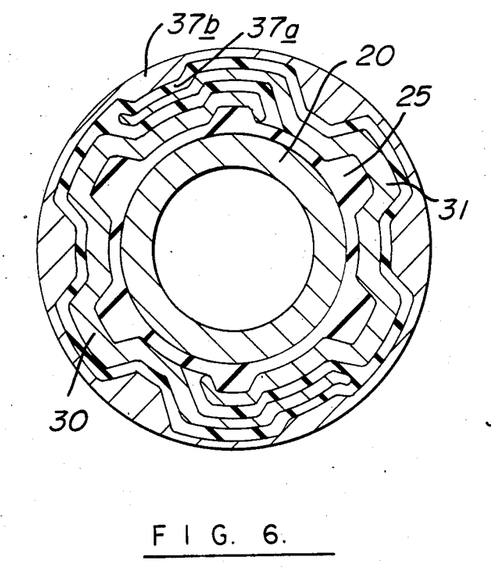
FIG. 6 is a view similar to FIGS. 4 and 5 but taken on line 6—6 of FIG. 2.
Figure 7:
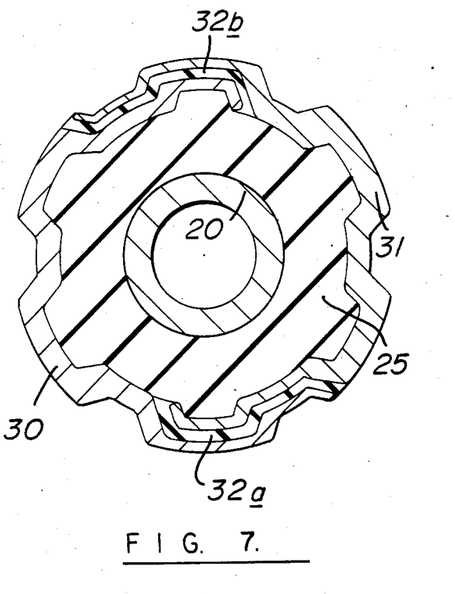
FIG. 7 is a view similar to FIGS. 4, 5 and 6 but taken on line 7—7 of FIG. 2.

The open section members 30 and 31 are interarranged to provide a closed tube-like cross-sectional configuration. Preferably, the open section members are interdigitated such that a portion of each member extends through the gap or space between the opposite longitudinal edges of the other member. Thus, as best seen in FIG. 5, the longitudinal flange $30a$ of the member 30 is received interiorly of the complentary shaped flange 31b of its companion member 31. The opposite flange 30b is disposed along the outside of the complementary shaped flange 31a of its companion member 31. The overlapped flanges 30a, 31b and 30b, 31a are separated by the layers of elastomer 32b and 32a which fills the space therebetween and bonds the open section members 30 and 31 together along opposite zones having an arcuate extent of about 30°. The layers of elastomeric material 32a and 32b between the overlapped flanges of the open section members 30 and 31 permit the longitudinal edges thereof to move lengthwise relative to one another when torque is applied to the members 30 and 31 adjacent to their opposite ends.

As noted heretofore, the body of elastomeric material 25 provides an elastic transverse connection between the outboard end 20a of the beam 20 and the tube-lke component 21. While the elastomeric material disposed in this location permits the tube-like component 21 to twist relative to the beam 20, it is desirable for the body of elastomeric material 25 to extend continuously along substantially the entire length of the beam 20 and to be engaged between its outer periphery and the inner periphery of the tube-like component 21. Furthermore, while it is desirable for the beam 20 and elastomeric body 25 to extend axially into the interior of the coupling 17, they may terminate closely adjacent to the coupling 17, as illustrated, without significant loss of transverse shear load carrying capacity. The presence of the elastomeric body 25 between the beam 20 and the tube-like component 21 along their lengths provides internal support for the tube-like component 21 and enhances the flexural and transverse stiffness of the structural member 14. Moreover, the elastomeric body 25 supports the tube-like component 21 and helps it to resist destabilizing Brazier-effect deformations which may be induced when certain loads are applied. It also absorbs a substantial amount of rotational strain energy. The resulting structural element, comprising a beam, tube-like component and elastomeric body has a flexural to torsional stiffness ratio that exceeds 100, and approaches 200, as contrasted with a ratio of about 10–20 for a structural element composed only of a tube-like component of the same construction.

For the purpose of providing additional transverse stabilization to the cross-section of the structural member 14, at least one, and preferably a series of stabilizer rings 35–40 (FIG. 3) are mounted on the outside of the tube-like component 21 in axially spaced relation. For instance, the stabilizer rings 35–37 are spaced apart axially adjacent to the inboard end of the member 14, and the stabilizer rings 38–40 are spaced apart axially adjacent to the outboard end thereof. Each stabilizer ring, such as the ring 37, includes a layer of elastomeric material 37a surrounding the outer periphery of the tube-like component 21 and a collar 37b surrounding the elastomeric layer 37a. The elastomeric layer 37a of the stabilizer ring 37 permits the longitudinal edges of the open section members 30 and 31 to move lengthwise relative to one another during torque application and cooperates with the open section members to resist destabilizing Brazier-effect deformations of their cross-sections during application of various other loads.

Figure 4:
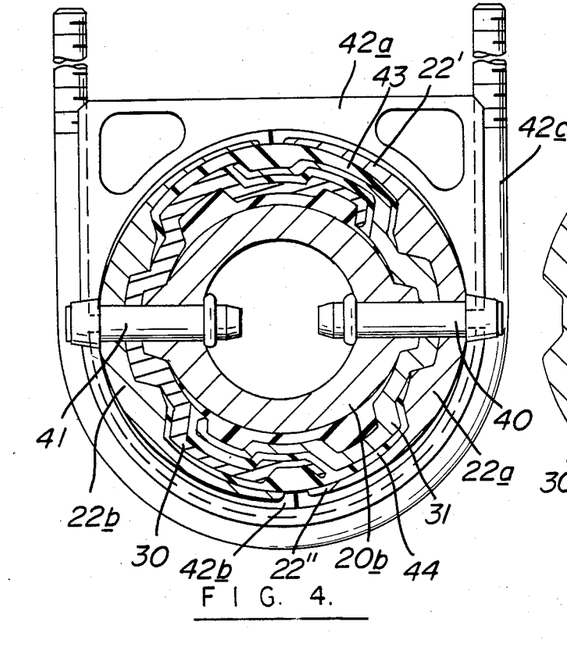
FIG. 4 is a greatly enlarged transverse sectional view taken on line 4—4 of FIG. 2.

The inboard end of the beam 20 and the tube-like component 21 are securely connected to the mounting bracket assembly 23. To this end, as best seen in FIG. 4, the first connecting means 22 includes a pair of opposed arcuate retainers 22a and 22b having internal splines and grooves complementary to the corrugations provided on the open section members 30 and 31. The retainer 22a, its associated open section member 31, and the inboard end 20b of the beam 20 are engaged adjacent to their respective cross-sectional medians and connected together by a blind fastener 40. The opposite retainer 22b and its associated open section member 30 are similarly connected to the beam end 20b by a diametrically extending blind fastener 41. Thus, the inboard ends of the open section members 30 and 31 are securely connected to the beam 20, and the beam 20 in turn is fixedly connected to the underside of the helicopter fuselage as by the upper and lower clamping blocks 42a and 42b, respectively, and U-bolt 42c, forming the mounting bracket assembly 23.

To minimize the torsional stiffness of the member 14, it is desirable for the fasteners 40 and 41 to be located at about the midpoint of the arcuate extent of the open section members 31 and 30 to permit a maximum amount of longitudinal edge movement to occur during torque application. To the same end, the marginal flanges of each retainer, such as the flanges 22' and 22" of the retainer 22a are spaced from the underlying open section member, such as the member 31, by layers of elastomeric material 43 and 44.

Preferably, the beam 20 extends continuously through the mounting bracket assembly 23 and into the interiors of both structural elements 14 and 15. The retainers 22a and 22b are machined from semi-cylindrical stock pieces which are internally shaped to engage the beam inboard of the ends of the tube-like components. Each tube-like component, however, is separate from the other and is discontinuous in the mounting bracket assembly 23 in order to provide independent wheel suspension.

As noted heretofore, the application of torsional loads to the structural member 14 causes the longitudinal edges of the open section members 30 and 31 of which it is composed to move longitudinally relative to one another. For the purpose of applying torque while accommodating this longitudinal edge movement, the coupling 17 is provided.

Figure 8:
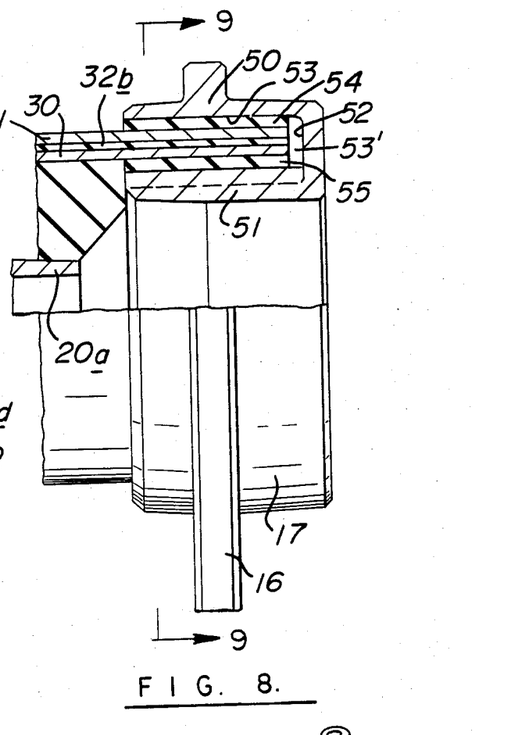
FIG. 8 is a partially sectioned view of an end coupling used to connect the wheel to the link in FIG. 2.
Figure 9:
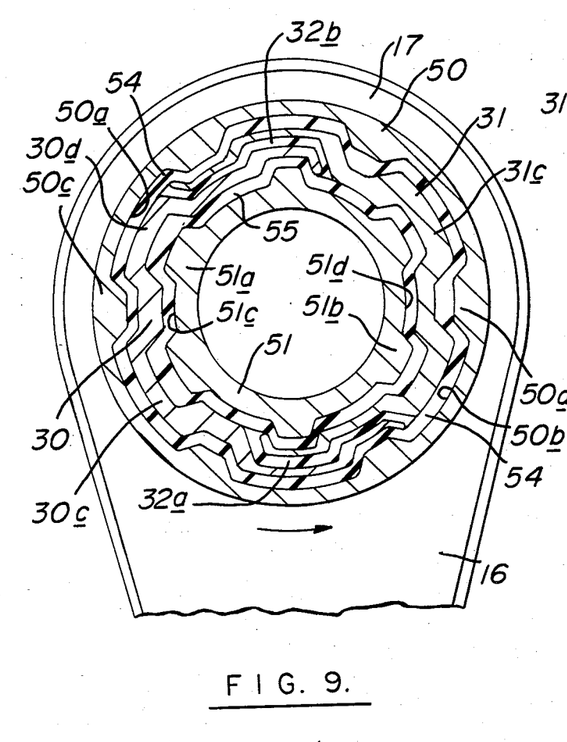
FIG. 9 is a sectional view taken on line 9—9 of FIG. 8.

As best seen in FIGS. 8 and 9, the coupling 17 is connected to the upper end of the trailing wheel arm 16 and receives the outboard end portions of the open section members 30 and 31. The coupling 17 has an outer peripheral sleeve 50 which is spaced from an inner peripheral sleeve 51 and which cooperates with an end wall 52 to define a recess 53 which receives the outboard end of the structural member 14. As best seen in FIG. 9, the inner sleeve 51 has a series of raised longitudinally extending splines 51a, 51b which register with correspondingly located grooves 50a and 50b provided in the outer sleeve 50. The inner sleeve 51 also has a series of grooves 51c and 51d which register with internal splines 50c and 50d on the outer sleeve 50. The corrugated open section members 30 and 31 have complementary shaped portions interposed between the splines and grooves, such as the raised portion 30d of the member 30 interposed between the spline 51a and the groove 51a of the coupling sleeves 51 and 50, respectively. A layer of elastomeric material 54 engages between the inner periphery of the outer sleeve 50 and the outer peripheries of the open section members 30 and 31 throughout their entire peripheral extent. In like manner, a layer of elastomeric material 55 engages between the outer periphery of the inner sleeve 51 and the inner peripheries of the open section members 30 and 31. The gap, or space, 53' between the ends of the open section members 30 and 31 and the end wall 52 of the coupling 17 ensures uninhibited movement of the edge ends of the open section members 30 and 31 toward end wall 52 when torque is applied.

In use, as the torque arm 16 is rotated counterclockwise (FIG. 9) the internal splines on its outer sleeve 50, such as the splines 50c and 50d tend to move toward the raised portions of the open section members 30 and 31, such as the raised portion 30c and 31c. Such movement is resisted by the intervening layer of elastomeric material, and especially by the portions thereof which are primarily stressed in compression, to be such that the rotational load is transferred from the outer sleeve 50 to the open section members 30 and 31 via their outer peripheries. In like manner, simultaneous counterclockwise rotation of the inner sleeve 51 is transferred by the intermediate elastomer and open section members 30 and 31 to the inner periphery of the latter. The elastomeric layers 54 and 55 undergo shear strain along with the elastomeric layers 32a and 32b between the open section members 30 and 31 to permit the ends of the open section members to move into the space 53' in the coupling 17. Thus, the elastomeric layers between the sleeves of the coupling and the open section members provide a primarily compressive type of connection between the corrugated open section members and the sleeves 50 and 51 of the coupling 17 to apply torque while also providing a primarily shear type of connection which permits the requisite degree of longitudinal edge movement of the open section members 30 and 31. The longitudinal lips on the open section members 30 and 31 assist in preventing the open section members from buckling adjacent to the end coupling 17 when substantial torsional loads are applied.

Preferably, the elastomeric material 54 and 55 is a flexible polyurethane which is applied in such a manner as to bond the coupling 17 to the structural member 14. This eliminates the need to connect the open section members 30 and 31 to the coupling 17 by mechanical fasteners, such as the fasteners 40 and 41 employed to connect the inboard ends of the open section members 30 and 31 in the mounting bracket assembly 23 as illustrated in FIG. 4. Accordingly, the corrugated cross-sections of the open section members cooperate with the elastomeric material in the corrugated recess 53 in the coupling 17 to provide a simple yet effective low-cost connection which enables substantial torsional, flexural and sheer loads to be applied.

As noted heretofore, there are rotary shafting applications in which shafts of low torsional stiffness and high flexural stiffness are desirable to overcome certain vibration problems. To this end, the embodiment of FIGS. 11-14 is provided.

Figure 11:
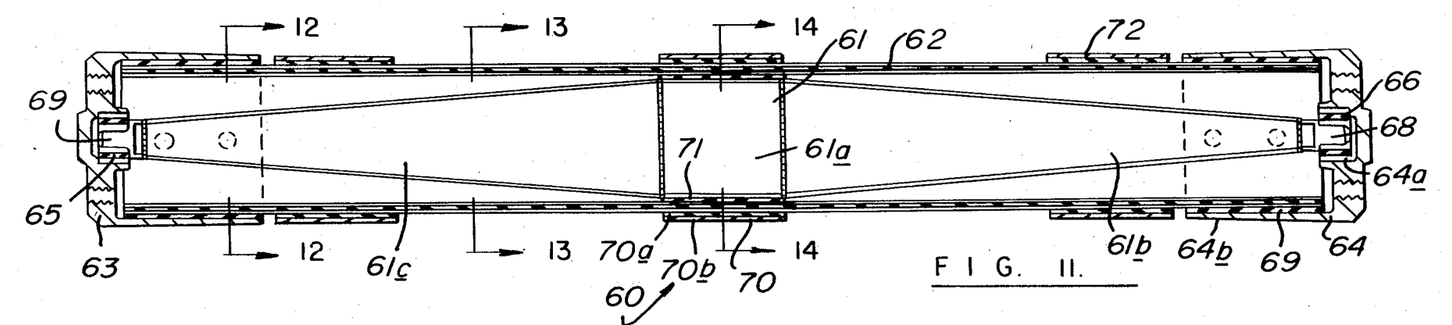
FIG. 11 is a longitudinal sectional view of a modified embodiment of the present invention.

Referring now to FIG. 11, the illustrated structural member 60 comprises an elongated beam 61 which tapers axially in opposite directions from its midpoint, or longitudinal median and a tube-like component 62 surrounding the beam 60 for its entire length. First and second end connector means 63 and 64, respectively, interconnect opposite ends of the beam 61 with the tube-like component 62 by means of elastomeric bearing members 65 and 66, respectively. The elastomeric bearing members 65 and 66 permit the end connectors 63 and 64 and the tube-like component 62 to twist relative to the beam 61 when torque is applied.

As best seen in FIG. 11, the structural member 60 is symmetrical with respect to its longitudinal median and with respect to its longitudinal axis. The beam 61 has a tubular central portion 61a and hollow tapered portions 61b and 61c which extend outwardly therefrom in opposite directions. Stub shafts 68 and 69 are provided on the outermost ends of the tapered portions 61b and 61c of the beam 61 and mount subminiature laminated radial elastomeric bearings 66 and 65, respectively.

Each end connector, such as the right hand end connector 64, has a central recess 64a which receives its elastomeric bearing 66. The end connector 64 also has one or more threaded bores for connecting the structural member 60 in a mechanical system. The end connector 64 has a tubular peripheral sleeve 64b which extends inwardly from the outer end of the tapered portion 61b of the beam 61 and surrounds the tube-like component 62 for a portion of its length. A layer of elastomeric material 69 is engaged between the outer periphery of the tube-like component 62 and the inner periphery of the connector sleeve 64b to permit the longitudinal edges of the members composing the tube-like component 62 to warp relative to the end connector 64 during application of torque.

A stabilizer ring 70 surrounds the tube-like component 62 and the cylindrical portion 61a of the beam 61. The stabilizer ring 70 includes a layer of elastomeric material 70a and a collar 70b surrounding the elastomeric layer 70a. In addition, a layer of elastomeric material 71 is engaged between the outer periphery of the cylindrical portion 61a of the beam 61 and the inner periphery of the tube-like component 62 in regsitry with the stabilizer ring 70. One or more stabilizer rings, such as the ring 72 located adjacent the right hand end of the member 60, may be utilized to provide transverse support for purposes described heretofore with respect to the previously discussed embodiment.

Figure 12:
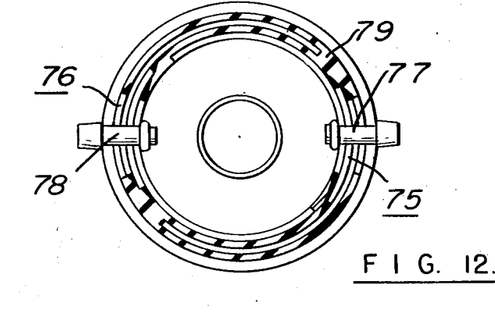
FIG. 12 is a transverse sectional view taken on line 12—12 of FIG. 11.
Figure 13:
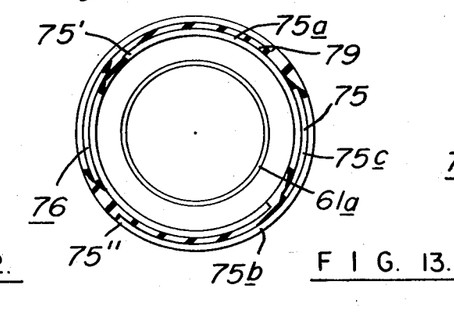
FIG. 13 is a transverse sectional view taken on line 13—13 of FIG. 11.
Figure 14:
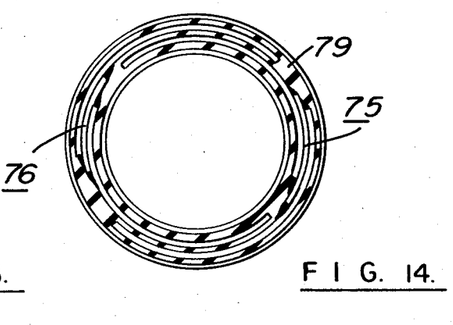
FIG. 14 is a transverse sectional view taken on line 14—14 of FIG. 11.

As best seen in FIG. 12, the tube-like component 62 comprises a pair of open section members 75 and 76 of like construction interdigitated similar to the manner in which the open section members in the previously mentioned embodiment are arranged. Each open section member, such as the member 75 (FIG. 13) comprises a curved thin wall section 75a and a similarly shaped thin wall section 75b offset circumferentially and separated radially therefrom by a relatively narrow thin section 75c located midway between opposite edges 75', 75". The sections are connected together by welding them along their overlapped edges. A layer of elastomeric material 70 separates the open section members along their lengths as in the previous embodiment. The thus fabricated open section member 75 has an overall arcuate extent between longitudinal edges 75' and 75" of about 240°.

The laminated open section members 75 and 76 are mechanically connected to the sleeve portions of the end connectors. For this purpose, blind fasteners, such as the rivets 77 and 78 are provided. As best seen in FIG. 12, the rivets 77 and 78 pass through the central sections of the members and are disposed diametically opposite one another. Thus, the end connectors 63 and 64 are mechanically coupled to the tube-like component 62 which, in turn, is coupled to the beam 61 via the elastomeric bearings 65 and 66. As a result, the tube-like component 62 can twist relative to the beam 61 while permitting transverse shear and flexural loads to be imparted to the beam.

Figure 15:
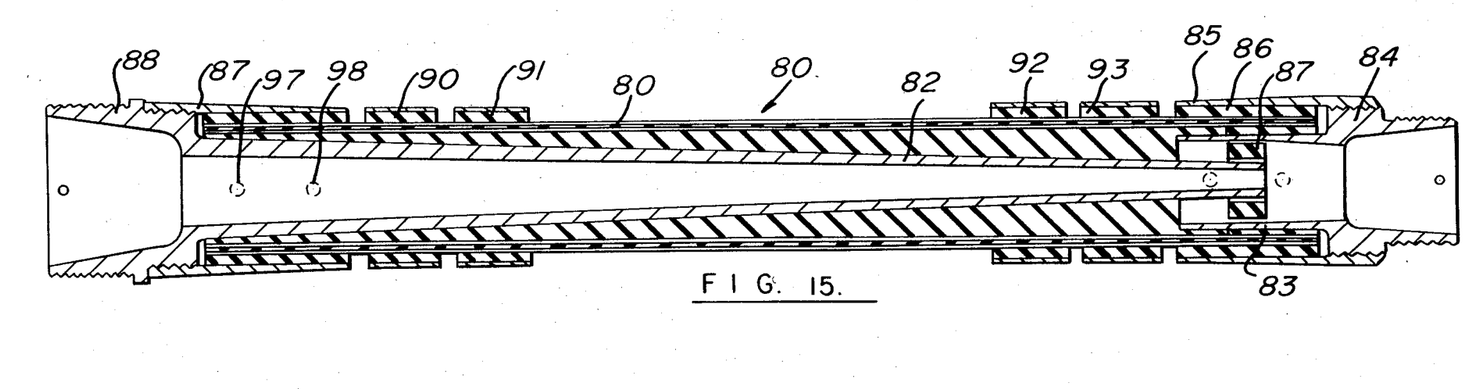
FIG. 15 is a longitudinal sectional view of another modified embodiment of the present invention.

A modified embodiment suitable for a variety of applications including a helicopter rotor to drive shaft flange linkage is shown in FIG. 15. In this embodiment, a structural member 80, similar to the structural member 14 illustrated in FIGS. 1-10, is provided, and a laminated radial elastomeric bearing 81 is mounted on the small end of the tapered beam 82 between the beam and a circular inner sleeve 83 provided on a threaded end connector 84. A collar 85 is threaded onto the outside of the end connector 84 and is separated from the tube-like component 80 by a layer of elastomeric material 86. A similar collar 87 is threaded onto the opposite end fitting 88 which is formed integral with the large end of the beam 82.

As in the previously mentioned embodiments, one or more stabilizer rings, such as the rings 90-93, are mounted in axially spaced relation on the tube-like component 80. A body of elastomeric material 95 is preferably mounted between the beam 82 and the tube-like component 80 and extends therealong for substantially their entire lengths. The tube-like component 80 is preferably provided by arcuate open section members interdigitated in the manner described heretofore and separated by a layer of elastomeric material along their lengths, and is preferably connected to the connector fittings 84 and 85 by fasteners 97, 98 arranged such as in the manner illustrated in FIG. 12. In this embodiment, the end fittings 84 and 88 permit substantial bending loads to be imparted to the tube-like component 80 via the elastomeric layer 86. The elastomeric bearing 81 permits transverse shear loads to be transferred from the end connector 84 to the beam 82. Also, the fasteners at opposite ends, such as the fasteners 97, 98, permit axial loads to be applied to the tube-like component 80.

Figure 16:
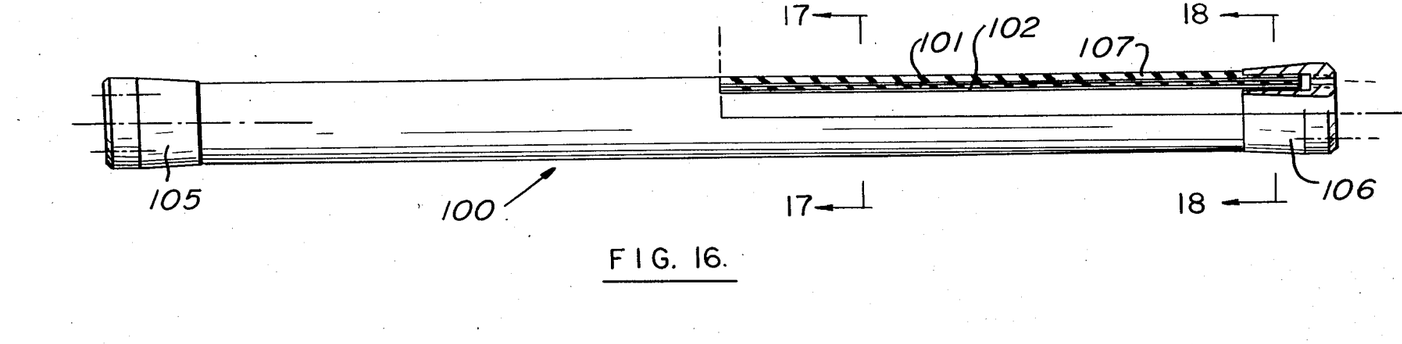
FIG. 16 is a partially sectional side elevational view of a drive shaft embodying the present invention.

In another embodiment of the present invention, a mechanical element of low torsional stiffness particularly suited for use as a vehicle drive shaft is provided. As best seen in FIG. 16, the mechanical element 100 comprises a pair of corrugated, arcuate open section members 101 and 102, like the members 30 and 31, interdigitated and bonded together by layers of elastomeric material 103 and 104 similar to the manner in which the members 30 and 31 are bonded together. A pair of end fittings 105 and 106 are mounted on opposite ends of the element 100 for applying torque thereto. The end fittings are similar in construction to the coupling 17 (except for the torque arm 16) and are bonded to the mechanical element 100 in a like manner.

Figure 17:
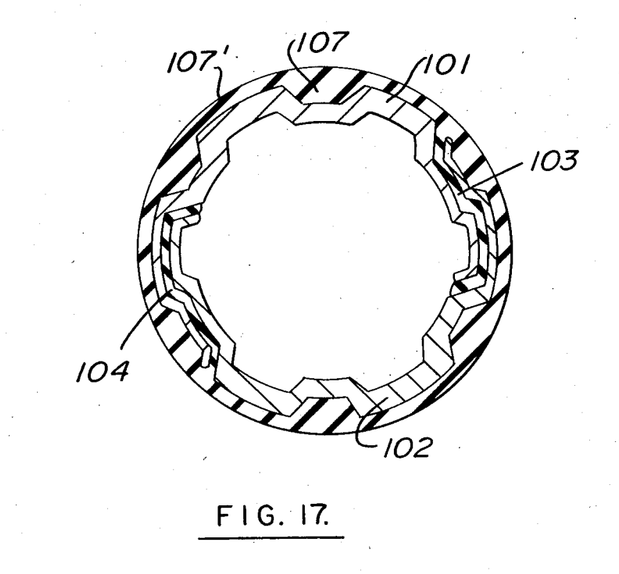
FIG. 17 is an enlarged transverse sectional view taken on line 17—17 of FIG. 16.
Figure 18:
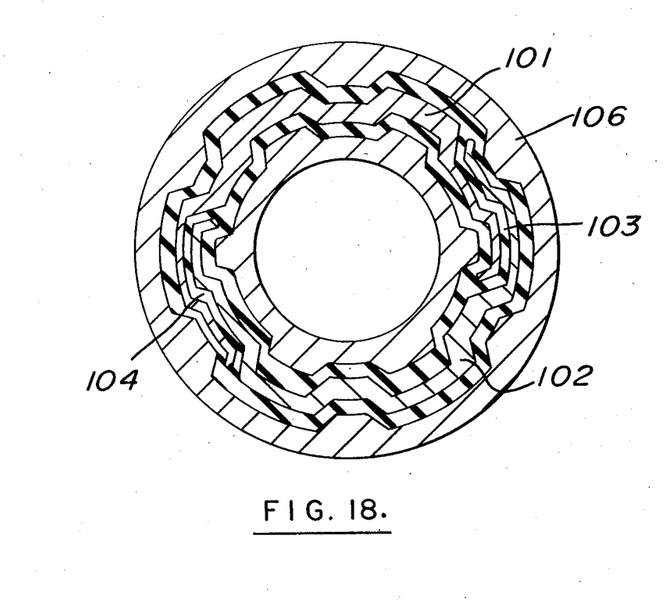
FIG. 18 is an enlarged transverse sectional view taken on line 18—18 of FIG. 16.

Unlike the previous embodiments, in which the open section members are supported externally by separate axially spaced stabilizer rings, in this embodiment the open section members 101 and 102 are supported externally continuously along their lengths by a support tube, or collar, of elastomeric material 107. As best seen in FIG. 17, the elastomeric support tube 107 fills the outer grooves in the open section members and has a cylindrical outer peripheral surface 107'. The elastomeric tube 107 is bonded onto the open section members are shrunk fit thereon to precompress the same radially and elastically. This is accomplished by placing the assembled open section members in a mold and injecting a liquid elastomeric material, such as polyurethane, into the mold around their peripheries. As the polyurethane cures, it shrinks about 1.6%, and in shrinking circumferentially around the open section members, it elastically constricts around them. The thus formed elastomeric support tube 107 functions to support the open section members laterally along their entire length while permitting their longitudinal edges to move lengthwise, and to stabilize the mechanical element against Brazier-effect transverse deformations during application of various loads. The elastomeric support tube 107 also dampens vibrations, attenuates sound transmission, and protects the open section members from damage. Because the elastomeric support tube 107 is molded in place, the mechanical element 100 is capable of being manufactured economically. If desired, the elastomeric support tube 107 may be utilized in combination with the structural elements of FIGS. 1-15 in lieu of the separate stabilizer rings.

The present invention also provides a unique mechanism for transmitting angular motion between spaced locations on an axis and simultaneously inverting the direction of angular motion so that the direction of motion at one location on the axis is opposite the direction of motion at the other location theron. To this end, as best seen in FIG. 19 (Sheet 3) the mechanism comprises an elongate beam 120 of open cross-section, i.e. a longitudinally slit tube, or preferably an array of thin wall beams of open cross-section mounting between its ends a ring, or collar, 121, like in construction which permits the longitudinal edges 120a and 120b of the tube to move lengthwise relative to one another when torque is applied at opposite ends thereof. A means is provided for restraining, or preventing, the ring 121 from rotating about the axis of the slit tube 120 when torque is applied.

In the schematic illustration, the restraining means includes an arm 125 extending tangentially in a lateral direction from the support ring 121; however, other anti-rotation means may be provided. An input fitting 122 is mounted at the left end of the slit tube 120, and an output fitting 123 is mounted at the opposite end thereof. With this mechanism, rotation of the input fitting 122 through a predetermined angle in the direction of the arrow thereon causes the output fitting 123 to rotate through the same angular extent in the direction of the arrow thereon, but in the opposite direction, as a result of the interaction with the slit tube 120 of the stationary supported ring 121 intermediate its ends.

This mechanism has utility in a variety of mechanical applications wherein inversion of angular motion along an axis is desired. For instance, if installed in a helicopter rotor system with the angularly restrained stabilizer ring 121 being mounted on the rotational axis of the rotor drive shaft, and a blade connected to each end, twisting clockwise of one blade on its axis to increase the angle of incidence, i.e., leading edge up, will automatically cause the diametrically opposite blade to twist counterclockwise in the direction of increased angle of incidence, i.e. leading edge up, through the same angular extent, thus providing collective pitch control synchronization.

In view of the foregoing, it should be apparent that the present invention now provides mechanical elements of high flexural stiffness and low torsional stiffness. The elements have high resistance to transverse shear. Also, the present invention provides other structural improvements for laminated open section elements of low torsional stiffness, such as end fittings, stabilizing and mounting means.

While preferred embodiments of the present invention have been described in detail, various modifications, alterations and changes may be made without departing from the spirit and scope of the present invention as defined in the appended claims.

I claim:
1. A structural member for use in connecting structural elements, comprising:
a flexurally stiff elongate beam having a predetermined torsional stiffness about a longitudinal axis, an axially stiff tube-like component surrounding said beam and extending therealong in spaced relation therewith for at least a portion of its length, said tube-like component including at least one open section member at least partially extending around said axis and having a pair of spaced longitudinal edges movable lengthwise relative to one another during application of torque, said tube-like component having a torsional stiffness lower than the torsional stiffness of said beam first connecting means adapted to connect both said beam and tube-like component to one of said structural elements, second connecting means rotatable about an axis coaxial with said longitudinal axis and adapted to connect said tube-like component to another of said structural elements, and bearing means located between at least one portion of said beam and said tube-like component for permitting an end of said tube-like component to twist relative to said beam when torque is applied to said end of said tube-like component and for permitting said second connecting means to transfer shear loads to said beam, whereby the beam and tube-like component cooperate with the bearing means therebetween to provide a connection characterized by low torsional stiffness, high flexural stiffness and high shear resistance.

2. The structural member according to claim 1 wherein said tube-like component includes a pair of arcuate open section members interarranged to form a closed tube-like configuration.

3. The structural member according to claim 1 wherein said tube-like component has a substantially uniform cylindrical transverse cross-section along its length, and said beam has a cross-section that tapers between its end portions.

4. The structural member according to claim 1 wherein said torsional stiffness of said tube-like component is less than about 1/200 of the torsional stiffness of said beam, and the flexural to torsional stiffness ratio of said structural member is greater than about 100.

5. The structural member according to claim 1 including stabilizing means engaging said tube-like component laterally intermediate its ends for supporting the same during application of various loads.

6. The structural member according to claim 5 wherein said stabilizing means includes a body of elastomeric material engaged between said beam and said tube-like component.

7. The structural member according to claim 6 wherein said body of elastomeric material extends between said beam and said tube-like component for a major portion of their lengths.

8. The structural member according to claim 7 including at least one layer of elastomeric material surrounding said tube-like component, and means surrounding said elastomeric layer to limit transverse deformations of said tube-like component during load application.

9. The structural member according to claim 8 wherein said means surrounding said elastomeric layer includes at least one collar having a lengthwise dimension shorter than the length of said tube-like component.

10. The structural member according to claim 9 including a plurality of said collars mounted in spaced relation on said tube-like component with a layer of elastomeric material engaged between each collar and said tube-like component.

11. The structural member according to claim 5 wherein said tube-like component includes a pair of open section members at least partially encircling said longitudinal axis, and a layer of elastomeric material engaged between said open section members.

12. The structural member according to claim 11 wherein both said open section members have similar transverse cross-sections with lengthwise extending gap-defining edges movable in opposite directions relative to one another during application of said torque, and wherein said open section members are arranged with the edge gap of one offset angularly from the edge gap of the other.

13. The structural member according to claim 12 wherein a portion of one of said open section members extends through the gap of the other to define a tubular structure.

14. The structural member according to claim 13 wherein both of said open section members have corrugated transverse cross-sections along their lengths.

15. The structural member according to claim 11 including a layer of elastomeric material surrounding said open section members intermediate their ends.

16. The structural member according to claim 11 including a plurality of elastomeric layers and collars surrounding said open section members and mounted in axially spaced relation thereon closer to the ends of said tube-like component than to the middle thereof.

17. The structural member according to claim 11 wherein at least said second connecting means inludes an end fitting at least partially surrounding an end portion of said tube-like component, and a layer of elastomeric material engaged between said tube-like component and said fitting.

18. The structural member according to claim 17 wherein at least said end portion of each open section member has a plurality of axially extending outwardly projecting splines and said fitting has a plurality of axially extending grooves extending in spaced parallel relation with said splines, and said layer of elastomeric material is inteprosed between said splines and grooves for transferring torque between said fitting and said open section members while permitting longitudinal movement of those portions of said open section members located adjacent to said splines and said grooves.

19. The structural member according to claim 18 wherein said fitting has an annular recess with an end wall receiving said tube-like component with a space between said end wall and end edges of said tube-like component to freely accommodate movement of said end edges.

20. The structural member according to claim 18 wherein said tube-like component has a corrugated transverse cross-section and said fitting has a recess wtih a complementary corrugated grooved cross-section receiving said tube-like component, and said layer of elastomeric material is disposed in said recess between said corrugated cross-sections.

21. A structural member for use in connecting structural elements, comprising:

a flexurally stiff elongate beam having a predetermined torsional stiffness about a longitudinal axis, an axially stiff tube-like component surrounding said beam and extending therealong in spaced relation therewith for at least a portion of its length, said tube-like component having a torsional stiffness lower than the torsional stiffness of said beam, first connecting means adapted to connect both said beam and tube-like component together and to one of said structural elements for preventing relative rotation between the beam and tube-like component about said longitudinal axis while permitting transverse shear and flexural loads to be transferred therebetween, second connecting means rotatable about an axis coaxial with said longitudinal axis and adapted to connect only said tube-like component to another of said structural elements so that said tube-like component can rotate relative to said beam adjacent to said second connecting means, and bearing means located between at least one portion of said beam and said tube-like component for permitting said tube-like component to twist relative to said beam when torque is applied to said tube-like component by said second connecting means and for permitting said second connecting means to transfer shear loads to said beam, whereby the beam and tube-like component cooperate with the bearing means therebetween to provide a connection characterized by low torsional stiffness, high flexural stiffness and high shear resistance.

* * * * *